(No Model.)  
2 Sheets—Sheet 1.
M. J. CUSHMAN.
APPARATUS FOR MILKING COWS.
No. 594,860. Patented Dec. 7, 1897.
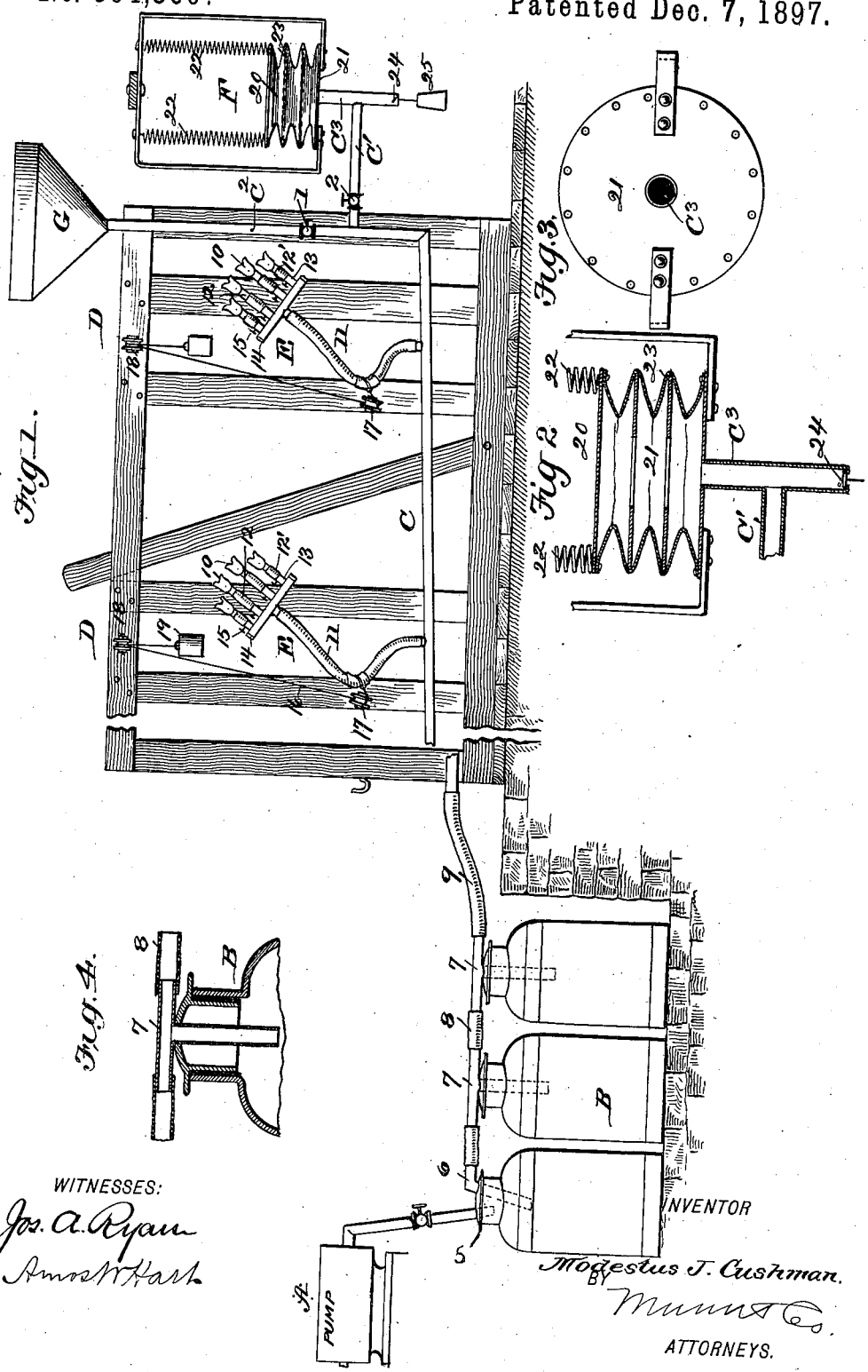
WITNESSES:  
Jos. A. Ryan  
Amos W. Hart
INVENTOR  
Modestus J. Cushman  
BY Munn & Co.  
ATTORNEYS.

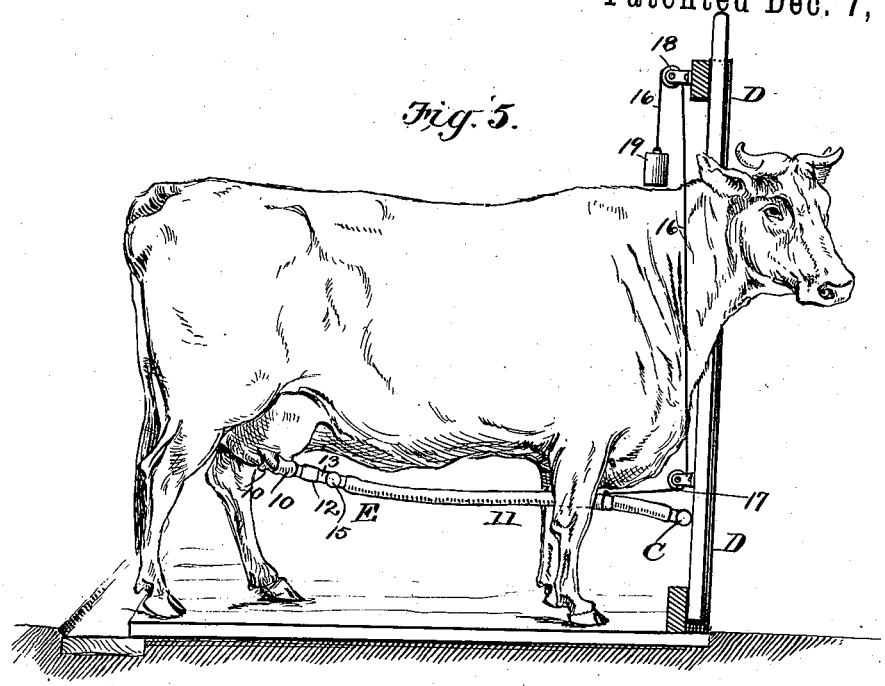

UNITED STATES PATENT OFFICE.

MODESTUS J. CUSHMAN, OF WATERLOO, IOWA.

APPARATUS FOR MILKING COWS.

SPECIFICATION forming part of Letters Patent No. 594,860, dated December 7, 1897.

Application filed September 16, 1895. Serial No. 562,701. (No model.)

*To all whom it may concern:*

Be it known that I, MODESTUS J. CUSHMAN, of Waterloo, in the county of Black Hawk and State of Iowa, have invented a new and Improved Apparatus for Milking Cows, of which the following is a specification.

By my apparatus suction and traction are applied to the animal's teats simultaneously and with a better result than can be attained by the old method of suction alone. The traction is applied in a forward direction—*i. e.*, toward the animal's head—and is positive and uniform.

The apparatus includes several novel feature and is more efficient and labor-saving than the "suction-milkers" ordinarily employed heretofore.

In the accompanying drawings, Figure 1 is a side view representing my entire apparatus as applied and arranged in a cow-stall. Fig. 2 is a vertical section, enlarged, of the expansible vacuum-regulator. Fig. 3 is a bottom view of the same. Fig. 4 is a vertical section of the top portion of one of the milk-receptacles and its pipe attachment. Fig. 5, Sheet 2, is a vertical section of the cow-stall, showing the apparatus connected with a cow. Fig. 6 is a partly-sectional view of one of the compound T's and teat-cups attached to it. Fig. 7 is a modification of the vacuum-regulator.

As shown in Fig. 1, the general features or main parts of the apparatus are, first, an air-pump or other vacuum-producer A; second, milk-receptacles B; third, a rigid milk-conducting pipe C, extending horizontally the length of the cow-stall in front of the stanchions D; fourth, a series of attachments or subsidiary apparatus E, consisting, mainly, of sets of teat-cups, flexible branch tubes connecting the latter with the main conductor C, and means for applying traction to such branch tubes; fifth, an automatic vacuum-regulating apparatus F, and, sixth, a water receptacle or holder G, both such parts F G being connected with the main milk-conductor C by branch pipes C' C², having stop valves or cocks 1 and 2, respectively.

Any vacuum-creating apparatus may be used instead of the air-pump A, and the same may be attached to the main conductor C at any point or to the milk-receptacles B. It will be seen that by the operation of the air-pump A or other vacuum-producer a vacuum is created in the system of pipes, tubes, milk-receptacles, teat-cups, and the vacuum-regulating apparatus and that the milk drawn from the cows to which the different sets of teat-cups are applied will enter the receptacles B.

I will now describe the apparatus and its operation with more detail. The air-pump A or other vacuum-producer may be of any preferred kind and operated by horse or other power. A pipe having a stop-cock connects it with the first of milk-receptacles B. I prefer to use the ten-gallon cans ordinarily used for holding and transporting milk. Each is provided with a special detachable lid or cover 5, having a rubber gasket to insure an air-tight joint. To each such cover 5 is attached a pipe that projects down into the can. The pipe 6, attached to the cover of the first can of the series, is L-shaped; but the others, 7, are T's. They are all connected by short rubber tubes 8. A longer flexible tube 9 connects the series with the rigid main conductor C. There is a set 10 of teat-cups and their proper attachments arranged at each stanchion D, and a flexible branch tube 11 connects such set 10 with the main conductor C, which runs nearly horizontally along in front of the stalls and stanchions at a height above the floor a little lower than the height of the cow's teats when the milking operation proceeds. It is plain that the flexible branch tube 11 being connected to the main conductor C at a point practically opposite the center of the stanchion the milk will flow without obstruction through the branch tube 11 into the main conductor C and thence into the milk-receptacles, and at the same time permits the cow to move about, as far as the stanchion will permit, without danger of entangling the branch tube 11 or disconnecting the cups from her teats. The four teat-cups of each set are connected by long and short flexible tubes 12 and 12', Figs. 1 and 6, with the nipples 13 of a rigid tube 14, secured to the free end of the branch tubes 11. For convenience of description I will hereinafter term these parts 13 and 14 a "compound T." Each nipple 13 has a stop-cock 15, as shown. The ends of the T are closed, Fig. 6, by removable screw-caps 14', having elastic packing. The longer tubes 12 are to be applied to the rear teats and the shorter ones, 12', to the front ones.

The means for applying traction in the manner hereinafter set forth consists of a cord, strap, or chain 16, attached to the branch tube 11 and passing over pulleys 17 and 18 and having a weight 19 attached to its free end. The pulley 17 is arranged in front of the cow at about the height of her breast, and the other pulley 18 is located at a higher point, so that the weight 19 always hangs free. The same result may obviously be reached by using either one pulley or a system of pulleys.

The automatic vacuum-regulator F (shown in Fig. 1) is constructed as follows: An expansible air-chamber 20 is arranged within a frame 21, whose lower head forms also the lower head of said air-chamber, the upper head of the latter being suspended by coil-springs 22. The flexible sides of the air-chamber 20 are held out at certain points by means of annular perforated diaphragms 23. A rigid pipe $C^3$ depends from the lower head of the air-chamber 20, and its open lower end is provided with a valve 24, that seats downward and is normally held down by a pendent weight 25. This tube $C^3$ is connected with the branch tube C' of the main conductor C, as shown.

The manner of using and operating the apparatus thus far described is as follows: The air-pump A or other vacuum-creating apparatus is set going, and the suction or vacuum thus created in the apparatus is maintained during the entire milking operation. The operator takes a set of milk-cups 10 from a hook on the adjacent stanchion D and successively applies them to the animal's teats and turns—i. e., opens—the valves 15 belonging to them, whereupon the teats are instantly drawn into the cups by suction. The operator then goes to the next animal and applies to its teats the set of cups suspended from the adjacent stanchion. The longer flexible tubes 12 extend to the rear teats between the forward ones 12'. Thus when the set of cups 10 is pulled forward, as shown in Fig. 5, the four tubes 12 12' apply traction evenly to all four teats. This traction is positive and maintained perfectly uniform by the cord 16 and weight 19. The traction is not only forward but practically horizontal. In other words, it is applied practically in line with the animal's belly. This has been found to produce a superior result, since the cow "gives down" her milk freely and entirely, so that she is milked more quickly and more milk is obtained than when no traction is applied or when it is applied in any other than the forward direction. This result is doubtless due to the fact that the forward pull causes no pain or inconvenience to the cow, it being the one to which she is accustomed when the calf is sucking. The rising-and-falling weight 19 and the length of the flexible branch tubes 11 enable the animal to move forward and back or sidewise at will without affecting the operation of the apparatus.

It is evident that the weight 19 may be added to or diminished, if desired, to change the degree of traction on the cow's teats. The operator attaches sets of teat-cups 10 to as many cows as possible, before the first cow is milked, and, as soon as this latter is done, he begins to detach by turning the valves 15 and removing the teat-cups 10 from the animal's teats, and continues until all the sets 10 have been detached. The milk flows from the teat-cups 10 into the compound T's, and through the branch tubes 11 into the main conductor C, and thus into the cans B. As soon as the milk rises in a can so that it covers and seals the mouth of the tube 6 or 7, that projects into it, it is apparent the suction will be arrested for that particular can, and hence no more milk will enter it. When the milking operation has been completed, the special covers 5 are detached and the ordinary covers applied, whereby the cans are ready for shipment. Thus no supplementary milk-receptacles are required and no transfer of milk from it into shipping-cans is necessary.

The automatic vacuum-regulator F serves to maintain a practically uniform tension or vacuum in the apparatus—that is to say, whenever the suction exceeds a certain degree the weighted valve 24 rises and opens, thus admitting air which supplies the vacuum up to the point where the weight again overcomes it, when the valve 24 seats itself again. This operation is repeated whenever the tension of the vacuum exceeds the weight of the valve and its appendage. The air admitted past the valve 24 rushes through the pipes $C^3$ C' C to the milk-receivers B, and thus hastens the flow of milk, so that the action of the vacuum is promoted. When the milking is done, the valve 15 in the nipple 13 farthest from the milk-receptacles B is opened and air allowed to enter, which will force all the milk that may adhere to the pipes and tubes into said receptacles B, and the air-pump being also stopped the vacuum is of course quickly destroyed. The connection between the receptacles B and covers 5 being then broken the milk that is in the pendent tubes 6 7 enters the receptacles, so that the latter are filled to the desired height. The flexible tube 9 is then detached from the adjacent T and its open end hung upon a hook on the nearest stanchion D. The apparatus is now in readiness for the water-holder G to be brought into action. The cock 1 in its connecting-pipe $C^2$ is opened and water flows into and fills the main conductor C, the branch pipes 11, the cups 10, and T's and the flexible tube 9, out of which latter the water will flow, owing to its open end being lower than the water-holder G. The water is allowed to flow until it becomes clear or free from milk color, which indicates the apparatus is thoroughly rinsed. The opening in pipe 9 is then closed with a cork. The valves 15 of the nipples 13 are next opened and water allowed to flow out of the teat-cups 10 until it becomes clear of milk, when valves 15 are again closed, so that the cups are left full of water. The valve 2 in branch pipe C' is then closed, and thus the apparatus is left full of water. In the summer time the apparatus is left in this condition till the next milking time, when it is run off, but in winter the water may be run off immediately after cleaning, as above described, since it is not then necessary in order to keep the apparatus sweet. It will be seen that the main tube 14 of the compound T's may be easily inspected and also cleaned with a brush by removing its screw-caps, Fig. 6.

In the modification of the air-inlet apparatus shown in Fig. 7 a bellows-shaped expansible air-chamber 28 is attached to the outer end of the branch pipe C' and a weight 29 connected with its free side, as shown. An automatic spring-valve 30, opening inward, is applied to said pipe C'. These modified forms of automatic vacuum-regulators obviously operate like that shown in Fig. 1. The object of the regulator is to maintain the vacuum nearer perfectly uniform, since it supplements and also lessens the work of the automatic valve proper by allowing a certain degree of change of air tension or vacuum without affecting the said valve. The latter acts independently of the expansible air-chamber to allow inlet of air. It may be made as sensitive as possible by increasing or diminishing the size of the weight attached to it, according to the facility with which the air-chamber is adapted to expand and contract.

It is to be understood that I do not restrict my invention in its range of use or application, but propose to apply it to any milk-yielding animal of any species, with such modification in size or details of form of parts of the apparatus as the case may require.

Having thus described my invention, what I claim as new, and desire to secure by Letters Patent, is—

1. An apparatus for milking cows which consists of teat-cups, tubes connected thereto and to a common milk-conductor, means for creating a vacuum in such cups and tubes, and means constructed and arranged to apply a positive, uniform traction to the said conductor, substantially as and for the purpose described.

2. In a milking apparatus of the character indicated, the combination, with a series of sets of teat-cups and flexible tubes attached thereto, of flexible conductors with which such tubes connect, the main milk-conductor arranged at or below the height of the cow's breast and connecting with said flexible conductor, automatic means for applying a positive, constant, and uniform traction to the latter and by it to the cow's teats, and means for producing a vacuum in the conductors, tubes, and teat-cups, simultaneously with the application of traction, substantially as shown and described.

3. In a milking apparatus of the character indicated, the combination with the main milk-conductor located as specified, a series of flexible branch conductors 11, attached thereto, ropes and weights for pulling said flexible conductors, the compound T's having nipples provided with stop-cocks and attached and also arranged at right angles, to the conductors, two short and two longer flexible tubes attached to such T's, and an air-pump for maintaining a vacuum simultaneously with the traction, as specified.

4. The combination, with a milking apparatus proper, and a conducting-pipe, of a series of milk-receptacles, and a series of T-shaped tubes whose vertical portions extend down through the covers of said receptacles, tubes connecting the horizontal portions of such T-tubes, and an air-pump arranged as shown and described, to operate as specified.

5. The combination with a milking apparatus composed of teat-cups, tubes, and an air-pump, or other vacuum-producer, of a vacuum-regulator composed of an automatically-expansible air-chamber having a pendent open-end tube, a weighted valve seated within said tube, and opening inward, as shown and described.

6. The combination with the milking apparatus composed of teat-cups, tubes, air-pump, and a milk-receptacle, of a vacuum-regulator composed of an automatically-expansible air-chamber, an air-inlet valve therefor, adapted to open inward and thus automatically admit air, whether the air-chamber be wholly collapsed or not, as shown and described.

7. The compound T formed of a tube having open ends provided with removable, liquid-tight caps, and a series of nipples attached to the side of said tube, as shown and described.

MODESTUS J. CUSHMAN.

Witnesses:
A. J. EDWARDS,
W. W. MILLER.